Patented July 2, 1946

2,402,958

UNITED STATES PATENT OFFICE 2,402,958

PROCESS OF PRODUCING ACETALDEHYDE

Alfred R. Globus, Brooklyn, N. Y.

No Drawing. Application August 6, 1942,
Serial No. 453,899

5 Claims. (Cl. 260—605)

This invention relates to the hydration of acetylene to acetaldehyde, and particularly to an improved process of effecting such hydration in the vapor phase.

As heretofore practiced, the hydration of acetylene to acetaldehyde has usually been brought about by bubbling the acetylene through water having a suitable oxidizing catalyst in solution therein for facilitating the hydration. This method of effecting hydration results in a relatively slow production of acetaldehyde, since a considerable part of the acetylene tends to pass through the reaction zone unhydrated and therefore has to be separated from the acetaldehyde and recycled.

An object of the present invention is to insure a more rapid, a more certain and a more complete reaction. To this end the invention contemplates the carrying out of the reaction in the vapor phase, that is, with the water, which is to be combined with the acetylene, in the form of steam.

An important feature of the invention is the arrangement of the catalyst which facilitates the combination of the water and acetylene to form acetaldehyde on a carrier in such manner that the mixture of steam and acetylene may be brought into cooperative relation thereto, a further important feature of the invention being the provision of means for immediately regenerating any catalyst which has become reduced in activity as a result of the rapid reaction which takes place at the higher temperatures employed with this process. To this end the invention contemplates the passage over the catalyst, simultaneously with the mixture of acetylene and steam, of air which will serve forthwith to reoxidize to the higher valence the metallic constituent of the catalyst which may have been reduced by the reaction to a lower valence.

An important feature of the invention, therefore, is the arrangement of the oxidizing catalyst, which facilitates the combination of water in the vapor form with acetylene to form acetaldehyde, upon an inert carrier in such manner that the mixture of steam and acetylene may be brought into intimate reactive relation thereto and the passage over this catalyst, not only of a mixture of steam and acetylene in the proper proportions to combine to form acetaldehyde, but also, at the same time, of a sufficient amount of air to furnish oxygen for regenerating the catalyst substantially as rapidly as it may be reduced by the reaction.

Other objects and important features of the invention will appear from the following description and claims.

In practicing the novel process of the present invention a suitable procedure is as follows:

A tower, which may conveniently be built of acid-proof bricks, is filled with an absorbent siliceous material, such as porous tile, briquetted kieselguhr or kaolin, this material, in the form of lumps providing interstices for the passage of gases and vapors therebetween, having first been saturated with a solution of a catalyst or with a liquid carrier in which the catalyst may be merely in suspension, the purpose being to cause the catalyst to enter the pores and coat the surface of the carrier sufficiently so that it may be in a position to facilitate the reaction between the steam and acetylene. Any suitable catalyst such as those that have heretofore been used in facilitating the hydration of acetylene to acetaldehyde by other processes may be employed, for example, mercuric sulphate. However, it has been found in practice that superior results are obtained if, instead of the usual catalyst employed in prior processes, a catalyst which consists of a concentrated solution of mercuric sulphate in sulfuric acid containing a mixture of ferric, chromic and ceric sulphate together with titanium oxide and manganese dioxide be used. A typical solution would be as follows:

| | | |
|---|---|---|
| Sulfuric acid | grams | 300 |
| Mercuric sulphate | do | 150 |
| Ferric sulphate | do | 150 |
| Chromic sulphate | do | 50 |
| Ceric sulphate | do | 10 |
| Manganese dioxide | do | 20 |
| Titanium dioxide | do | 10 |
| Water | liters | 1 |

A suitable tower having been filled with a carrier mass of the type hereinabove described or with pumice stone, and this carrier having been saturated with a suitable catalyst such as the one above described, the mixture of acetylene, steam and air is passed through the mass starting at the bottom. The quantities of each of the reactants will preferably be substantially in the proportion of 1 mole of $C_2H_2$ to $1\frac{1}{2}$ moles of $H_2O$ in the form of steam at 212° F. and $\frac{1}{4}$ to $\frac{1}{2}$ mole of contained oxygen in the air. The air is preferably preheated and is mixed with the steam in the preheated condition before introduction into the tower. The acetylene may either be introduced into the incoming stream of air and steam or it may be separately introduced into the tower in the neighborhood of the air and steam inlet.

If the acetylene is not preheated, sufficient superheat may be provided in the steam or air or both to provide for bringing the acetylene up to the desired reaction temperature.

As this mixture of steam, acetylene and air passes up through the tower and comes into contact with the catalyst carried by the above described carrier, the catalyst will cause the steam and acetylene to interreact to produce acetaldehyde. By reason of the temperatures employed, the acetaldehyde, as it is formed, will be almost instantaneously distilled out of the top of the tower where it may then be secured by condensation or, if the acetaldehyde is to be electrolyzed to form ethyl alcohol and acetic acid, as, for example, by the process set forth in the copending application of Alfred R. Globus, Serial No. 445,593, filed June 3, 1942, it may be condensed and brought into solution by scrubbing it with cold electrolyte.

Although at the temperature at which this reaction takes place there will be considerable reduction of the mercuric salt to the mercurous salt and likewise a tendency to reduce the ferric and chromic salts to ferrous and chromous salts, reoxidation of the catalyst by the oxygen in the air passed thereover together with the steam and acetylene will also take place almost immediately, this reoxidation being facilitated by the higher temperatures employed. There will thus be a constant regeneration of the catalyst and the process may be practiced continuously.

It will be noted further that, by reason of the temperatures employed, fractional separation of the acetaldehyde and any unutilized water and air takes place substantially automatically, the water vapor condensing at a much higher temperature than the acetaldehyde and any air that may be carried along with the acetaldehyde vapor being readily separable therefrom by scrubbing or by mere condensation of the acetaldehyde which takes place at any point below about 20° C.

It will be noted that the amount of steam used in the mixture of steam, acetylene and air is considerably more than the theoretical amount required to hydrate the acetylene to acetaldehyde. The reason for using an excess amount of steam is two-fold: First, to be sure to have enough to effect substantially complete hydration of the acetylene, and, secondly, to provide sufficient to prevent the mixture of air and acetylene from forming an explosive mixture.

The considerable amount of uncombined steam which passes through the tower in the operation of the process tends to pick up and carry with it some of the catalyst with which the catalyst carrier is coated and impregnated. The uncombined steam with the catalyst which it has carried through the tower into the discharge connections above the tower for the most part condenses in the outlet from the tower and tends to flow back down over the catalyst carrier to the lower end of the tower from which it may be drawn off. The dilute solution of catalyst thus drawn off from the tower is preferably concentrated and during the concentration, that is, during the boiling of the excess water off from the solution any reduced catalyst that is in the solution can be regenerated by passing air through the boiling solution.

To keep the catalyst in the tower properly replenished, this recovered and regenerated catalyst together with fresh catalyst to replace any permanently lost, is preferably placed in a container above the tower from which it may occasionally be permitted to drip down over the catalyst carriers in the tower thus insuring a uniform activity of the tower as a whole.

As above suggested, there is a tendency at the relatively high temperature employed in the process of this invention not only for rapid hydration of the acetylene to acetaldehyde, but for correspondingly rapid reduction of the oxidizing agents of the catalyst to their lower valences. The ferric, chromic and ceric sulfates tend to be reduced to the ferrous, chromous and cerous forms and there is also some tendency for reduction of the mercuric sulfate to mercurous sulfate although this is prevented to some extent by the presence of the other sulfates. In fact, it is particularly noticeable in the catalyst which is carried out of the tower by the steam and recovered after condensation of the steam at the lower end of the tower that the mercury constituent of this catalyst is still in the mercuric form whereas a considerable part of the ferric, chromic and ceric sulfates have been reduced.

The catalyst, however, which remains in situ on its carrier is constantly reoxidized or regenerated by the passage of the air thereover.

From the foregoing description it will be seen that the novel process of the present invention provides a quick and easy method of hydrating acetylene to acetaldehyde and makes possible the substantially continuous operation of the process without the stoppages usually required with prior processes for regeneration of the catalyst. Furthermore, the regeneration of the catalyst does not require the use of the expensive oxidizing agents now used such, for example, as nitric acid.

It will further be seen that the novel process of the present invention differs from the prior art vapor phase formation of acetaldehyde by the hydration of acetylene to acetaldehyde in a mixture of steam and acetylene passing over a catalyst in that not only is the acetaldehyde formed but a good part of the oxygen for the formation of acetaldehyde is furnished by the air and the catalyst is thus protected against a tendency to excessive reduction and, at the same time, the air acts to re-oxidize it if it has become reduced by giving up its oxygen to the acetylene. It will thus be seen that the use of air plus acetylene, plus steam, simultaneously is—

1. To oxidize the acetylene during the reaction without reducing the catalyst;

2. To re-oxidize any catalyst that may be reduced;

3. To provide inert or uncombined gaseous materials, such as the nitrogen in the air as means for moving the acetaldehyde into the condenser or, in other words, to use an ordinary trade expression—"blow out" the acetaldehyde into the condenser.

This makes a practicable commercial process of bringing about the hydration of acetylene to acetaldehyde in the vapor phase.

It is also to be noted that the catalyst used in the process has as one of its constituents a salt or oxide of titanium. The advantage of this is that titanium has a marked range of valences. In other words, it has, before reduction, a valence of 4, and after reduction a valence of 2.

I claim:

1. The continuous process of producing acetaldehyde which consists in passing a mixture of steam, air and acetylene over inert porous material impregnated with a catalyst, including mercuric sulphate, which facilitates the vapor phase hydration of acetylene to acetaldehye, the air constituent of the mixture being sufficiently in excess of any requirements of the vapor phase reaction to insure reoxidation of the catalyst in situ by the oxygen of said air constituent whenever said catalyst has been reduced in the hydration of the acetylene to acetaldehye, the commingled steam, air and acetylene being all heated to the required vapor phase reaction temperature before contact with the catalyst and the steam constituent of the mixture being sufficiently in excess of that required for the hydration to prevent the formation of an explosive air and acetylene mixture.

2. A process according to claim 1 in which preheated air for regenerating the catalyst is first mixed with the steam and the air and steam mixture is then mixed with the acetylene and passed together therewith over the catalyst.

3. A process according to claim 1 in which any catalyst which may be carried away with uncombined steam is replaced without interruption of the process by permitting a solution of active catalyst to drip down over the inert porous material.

4. A process according to claim 1 in which one of the oxide agents in the catalyst is titanium dioxide.

5. A process according to claim 1 in which the catalyst employed comprises sulphates of iron, chromium and cerium, and dioxides of manganese and titanium.

ALFRED R. GLOBUS.